C. E. JONAS.
FRICTIONAL GEARING.
APPLICATION FILED JUNE 2, 1916.

1,218,564.

Patented Mar. 6, 1917.
2 SHEETS—SHEET 1.

INVENTOR
Charles E. Jonas.

WITNESSES

BY

ATTORNEY

C. E. JONAS.
FRICTIONAL GEARING.
APPLICATION FILED JUNE 2, 1916.

1,218,564.

Patented Mar. 6, 1917.
2 SHEETS—SHEET 2.

INVENTOR
Charles E. Jonas.

WITNESSES
Guy M. Spring
J. Woodward

BY Richard Bowen
ATTORNEY

UNITED STATES PATENT OFFICE.

CHARLES E. JONAS, OF EDWARDS, MISSOURI.

FRICTIONAL GEARING.

1,218,564.  Specification of Letters Patent.  Patented Mar. 6, 1917.

Application filed June 2, 1916. Serial No. 101,378.

*To all whom it may concern:*

Be it known that I, CHARLES E. JONAS, a citizen of the United States, residing at Edwards, in the county of Benton and State of Missouri, have invented certain new and useful Improvements in Frictional Gearings, of which the following is a specification.

This invention relates to an improved frictional gearing and the principal object of the invention is to provide a frictional gearing having improved means for slidably mounting the gear disk of the main shaft so that it may be moved into and out of engagement with the gear of the driven shaft and to further provide improved actuating means for moving the gear longitudinally upon the driving shaft and releasably holding the gear in an adjusted position.

Another object of the invention is to provide a frictional gearing which will be very simple in construction but at the same time very efficient in operation and not liable to get out of order or need repairs.

This invention is illustrated in the accompanying drawings, wherein:—

Fig. 4 is a fragmentary sectional view through the transmission gear of the driving shaft with the driving shaft shown in elevation.

Fig. 5 is a fragmentary sectional view taken along the line 5—5 of Fig. 4.

Figure 1:
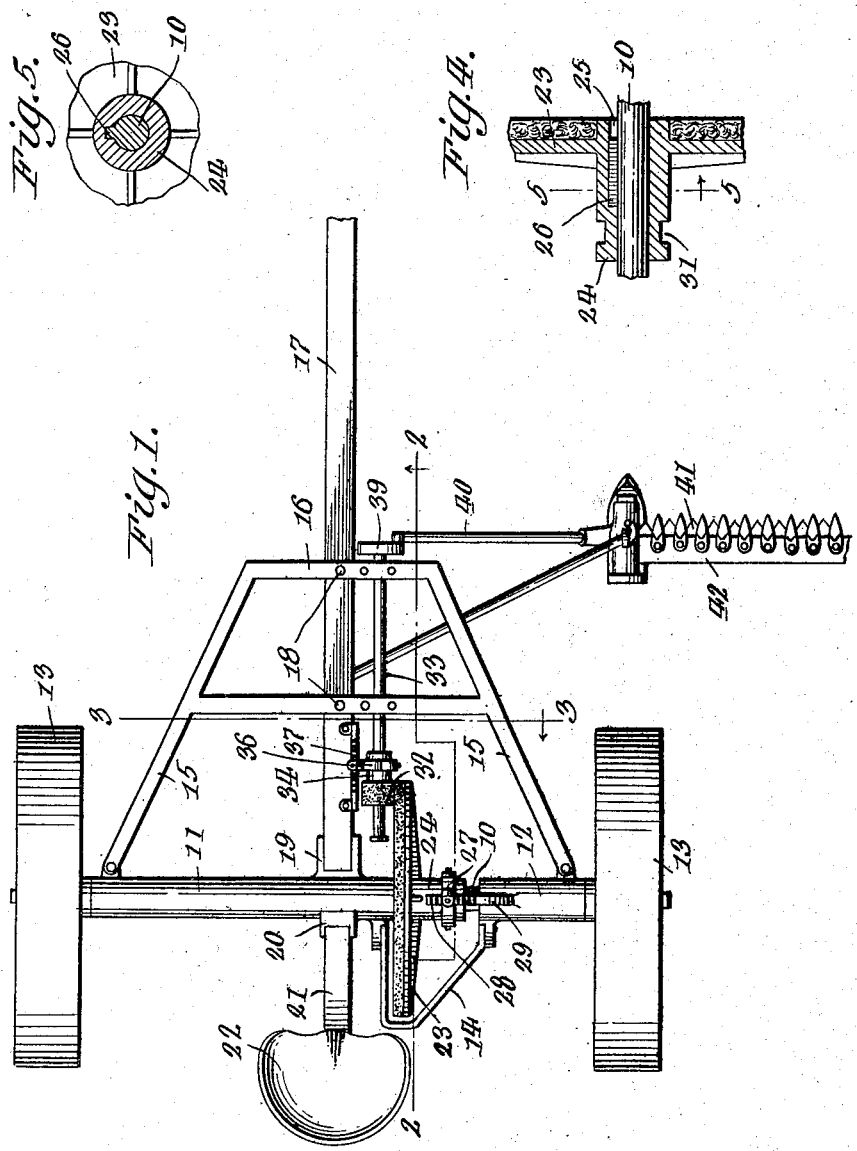
Figure 1 is a top plan view of the improved mowing machine.
Figure 2:
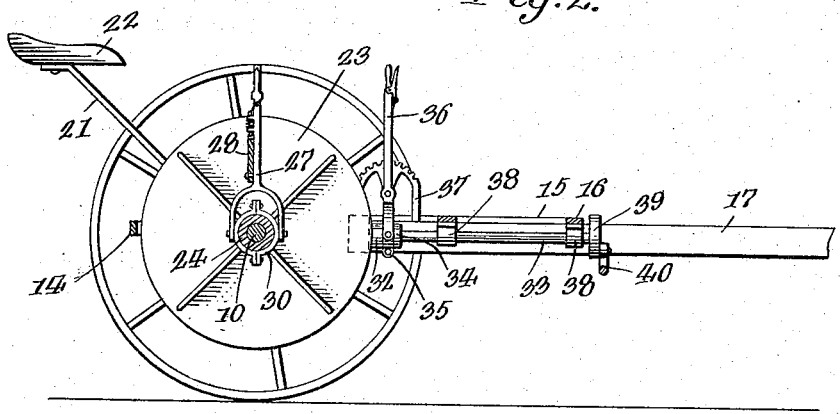
Fig. 2 is a longitudinal sectional view of the mowing machine taken along the line 2—2 of Fig. 1.
Figure 3:
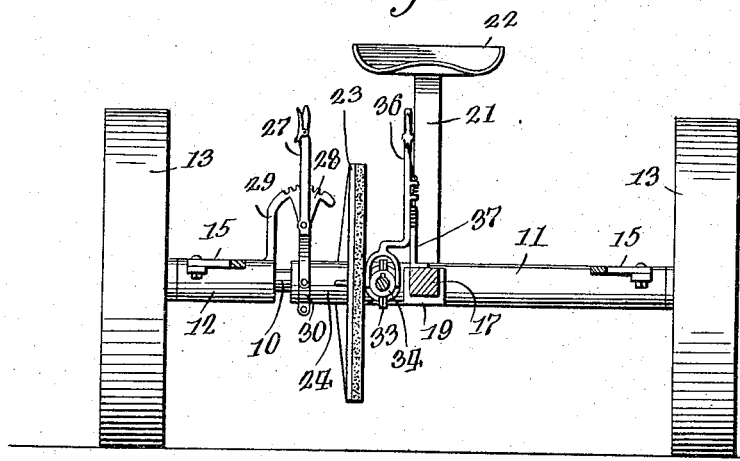
Fig. 3 is a transverse sectional view through the mowing machine taken along the line 3—3 of Fig. 1.

The axle 10 which constitutes the driving shaft of this mowing machine passes through the sleeves 11 and 12 and carries the supporting wheels 13 which serve to support the machine and also serve to rotate the driving shaft or axle. These sleeves 11 and 12 are connected by the guard bracket or yoke 14 and have their outer end portions connected with the arms 15 of the supporting frame 16. It will thus be seen that the sleeves will be held against rotation of the shaft 10 when the machine is drawn across the field by the draft animals which will be connected with the tongue 17. This tongue 17 extends beneath the frame 16 and is connected with the frame by means of bolts 18 and has its inner end portion fitting into the socket 19 positioned in front of the socket 20 with which the standard 21 of the seat 22 is connected. Therefore this mowing machine is provided with a frame which is very simple in construction but which is very strong and durable.

The driving shaft or axle 10 carries a gear plate or disk 23, the hub 24 of which fits upon the axle and is provided with a groove or key-way 25 to receive the key 26 of the shaft 10. Therefore the disk or gear plate can be moved longitudinally of the shaft but will be locked to the shaft so that it will rotate with the shaft. In order to move the gear longitudinally of the shaft, there is provided a shifting lever 27 which is pivotally connected with the rack 28 carried by the bracket arm 29 and has its forks pivotally connected with the collar 30 mounted in the groove 31 of the hub 24. This gear plate when moved to the position shown in Fig. 1 will engage the small gear 32 which is slidably mounted upon the driven shaft 33 and held against rotation thereon and therefore the driven shaft will be rotated through the medium of the gears 23 and 32. This gear 32 is similar in construction to the gear 23 and has its hub 34 provided with a groove to receive the collar 35 engaged by the forks of the latch lever 36 pivotally connected with the rack 37, carried by the tongue 17. By means of this latch lever 36, the gear 32 may be adjusted radially of the gear 23 and the relative speed of the driven gear 33 with respect to the gear 10 thus controlled. This driven gear which is mounted in the bearing 38 carried by the frame 16 is provided at its forward end with a head or disk 39 with which the pitman arm 40 for actuating the cutting knives 41 is pivotally connected. It will thus be seen that when in operation, the sickle knives will be reciprocated in the sickle bar 42 and further that the speed at which the knives move can be easily controlled by adjustment of the gear 32. It will further be seen that when desired, the gear 23 may be moved out of an operative position with respect to the gear 32 and thus the machine could be drawn across the field with the sickle knives inoperative. The manner of connecting the pitman 40 with the sickle knives has not been shown in detail as this sickle bar is of the conventional structure.

What is claimed is:—

A machine of the character described including a frame and sleeves connected with said frame, a driving shaft extending through said sleeves, a driven shaft carried by said frame, a gear carried by said driven shaft, a gear plate slidably mounted upon said driving shaft between said sleeves and provided with a hub having a key-way leading from one end and terminating intermediate the length of the hub, a key extending from said driving shaft into the key-way to prevent rotation of the gear plate upon the driving shaft and limit the longitudinal sliding movement of the gear plate in one direction, a guard yoke connecting said sleeves and extending about said gear plate, a rack carried by one of said sleeves, and an adjusting lever carried by said rack and engaging said gear plate for adjusting the gear plate longitudinally of the driving shaft.

In testimony whereof I affix my signature in presence of two witnesses.

CHARLES E. JONAS.

Witnesses:
. HENRY P. LAY,
JOHN E. MORGAN.

Copies of this patent may be obtained for five cents each, by addressing the "Commissioner of Patents Washington, D. C."